Patented May 13, 1952

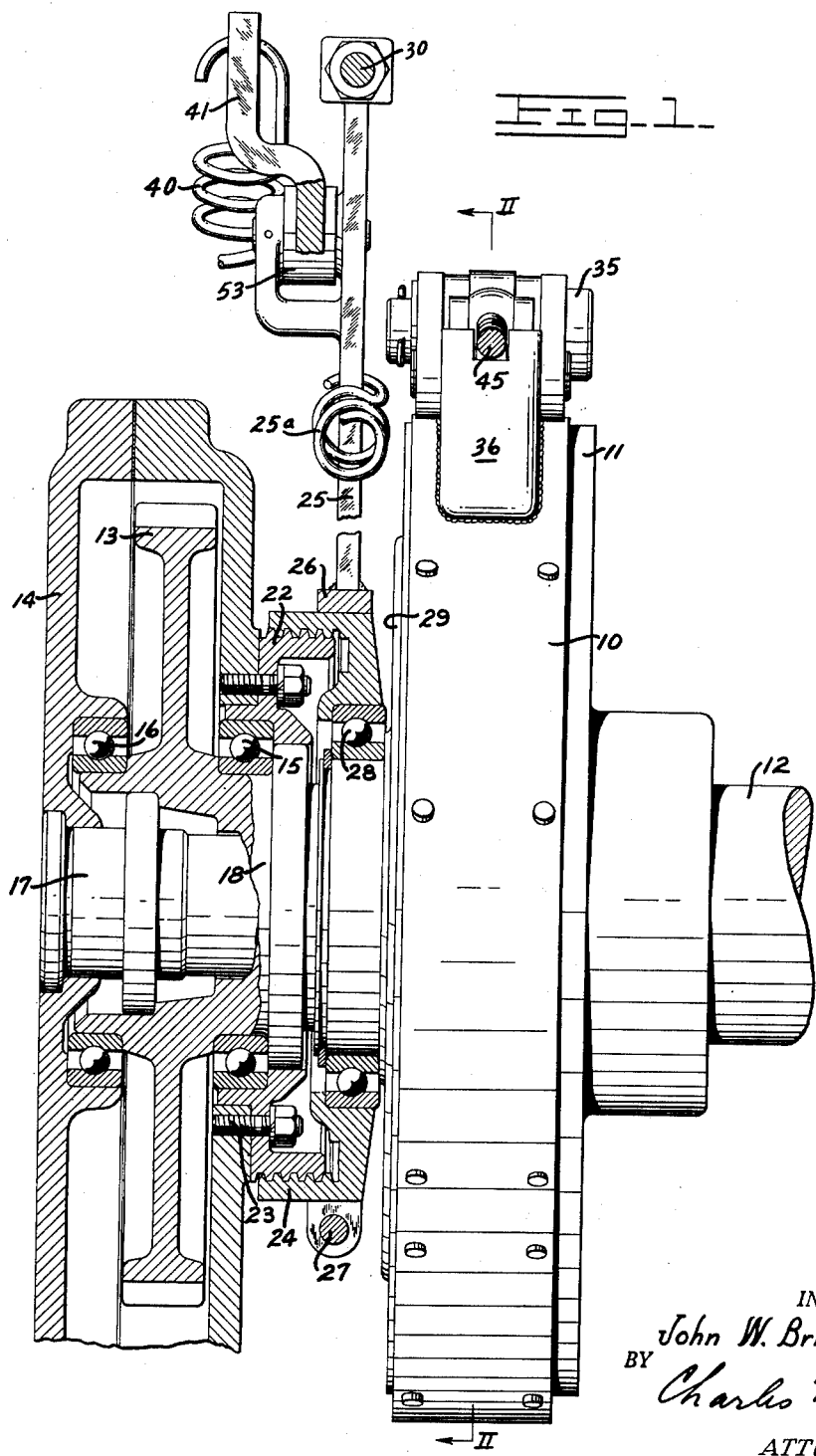

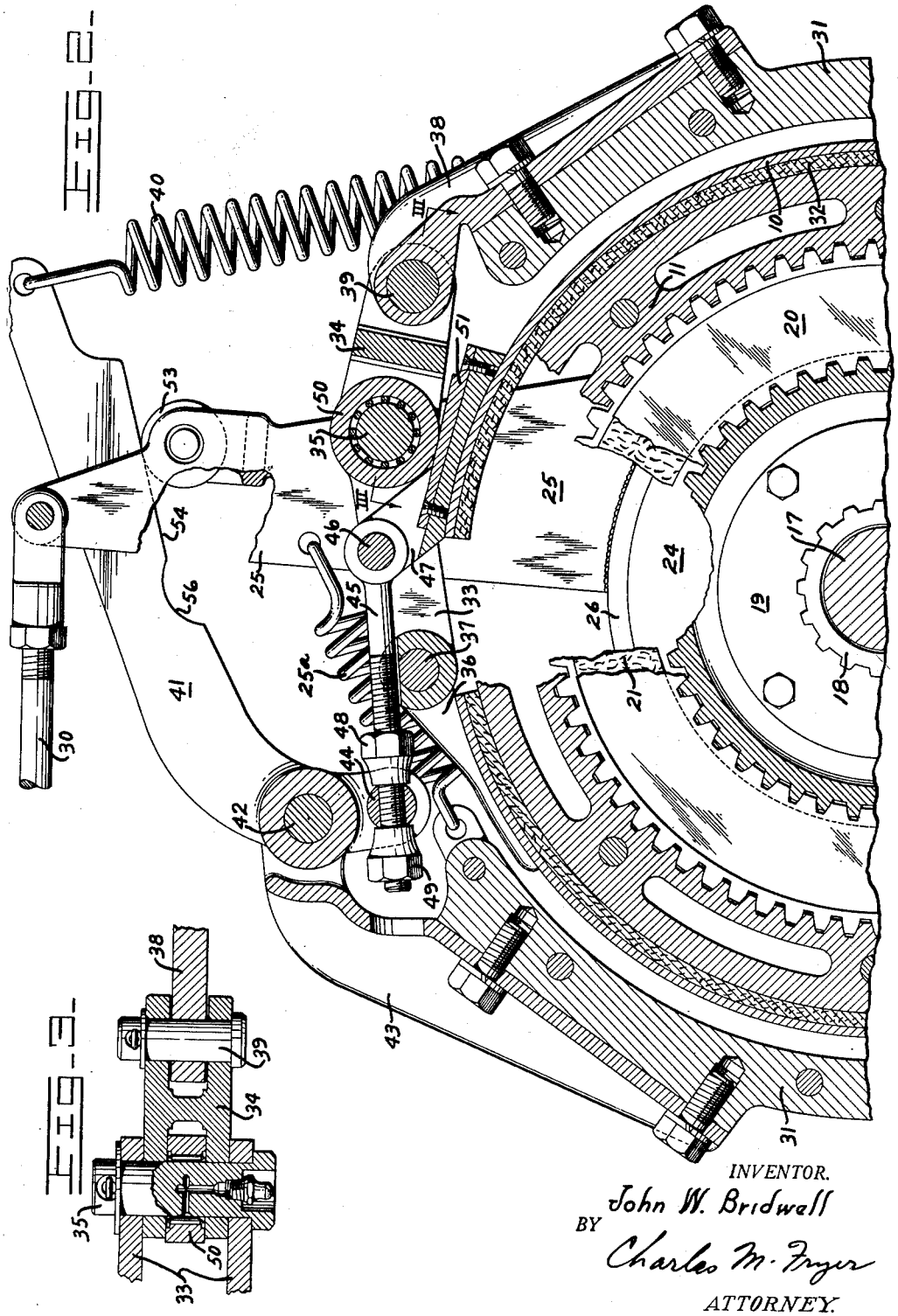

2,596,203

UNITED STATES PATENT OFFICE 2,596,203

ONE-WAY BAND BRAKE

John W. Bridwell, Peoria, Ill., assignor to Caterpillar Tractor Co., San Leandro, Calif., a corporation of California Application October 7, 1946, Serial No. 701,824

3 Claims. (Cl. 188—82.6)

This invention relates to mechanical brakes of the kind in which a brake band engages the surface of a drum to resist rotation of the drum and parts with which it is connected.

The invention is particularly adapted for use in connection with winches or cable controlling devices wherein the brake drum is normally free to be rotated in one direction but is gripped by a brake band automatically to resist its rotation in the opposite direction. It is conventional practice on winches and the like to employ a brake drum and a brake band encircling the drum. The band is anchored at one end and biased by spring action at its other end to hug the drum. When the drum is rotated in one direction, as for winding a cable on an associated cable drum or spool, it travels freely but when it is released and tends to rotate in the opposite direction, as would be caused by example by tension on the cable, the action of the biasing spring causes the brake band to encircle it tightly and to prevent its rotation with a snubbing action. It is undesirable that the brake band biasing spring be too heavy or under too great tension as it may cause unnecessary frictional contact between the band and drum at all times and because it is necessary to oppose or overcome its tension in order to permit the drum to rotate in the direction that is normally prevented by the operation of the brake.

It is, therefore, an object of the present invention to provide an improved mechanical brake of the automatic snubbing type in which the action of the brake is supplemented by pressure which is applied automatically each time the brake functions. It is also an object of the invention to provide a brake of the character described which operates in conjunction with a clutch and in which the brake can be released or disabled at will by manipulation of the clutch control mechanism. Further and more specific objects and advantages of the invention are made apparent in the following specification wherein a preferred form of the invention is described in detail by reference to the accompanying drawings.

For purposes of illustration, the invention is disclosed herein in its application to cable control mechanisms of the kind employed on a tractor wherein a power take-off shaft of the tractor is connected with a cable spooling mechanism. Its adaptability to other uses will however be readily apparent as the description proceeds.

In the drawings:

Fig. 1 is a view in elevation of a brake embodying the present invention illustrating in section portions of a drive mechanism and clutch with which the brake is associated in use;

Fig. 2 is a fragmentary sectional view taken on the line II—II of Fig. 1; and

Fig. 3 is a fragmentary section taken on the line III—III of Fig. 2.

In Fig. 1 of the drawings a brake band 10 is shown as encircling a drum 11 which is connected with a driven shaft 12 which may support a cable winding drum or the like (not shown). The drum 11 is adapted to be rotated through driving and clutch mechanism which do not form a part of the present invention but the principal portions of which will be generally described in order to facilitate an understanding of the manner in which the invention functions. A main drive gear 13, connected as by intermediate gears (not shown) with the power take-off shaft of a tractor or the like, is contained within a housing 14 and supported by bearings 15 and 16 for rotation about a dead shaft 17. The drive gear 13 has a hub 18 which extends into the brake drum 11 and carries a driving drum 19 splined to its inner end for rotation therewith as shown in Fig. 2 of the drawings. The drum 19 is externally toothed for the reception of clutch plates, one of which is illustrated at 20 in Fig. 2, and which cooperate with interspaced clutch plates, one of which is illustrated at 21. The clutch plates 21 are externally toothed for registry with an internally toothed portion of the brake drum 11. Consequently, when pressure is applied to the clutch plates 20 and 21 to bring them in face to face contact, rotation of the inner drum 19 is imparted through the clutch plates to the outer or brake drum 11.

The means for applying this pressure is illustrated in Fig. 1 wherein a threaded annulus 22 is shown as secured to the gear housing 14 as by bolts 23. An internally threaded ring or nut 24 is carried by the annulus 22 and is rotatable thereon by means of a clutch control lever 25 secured as by welding to a split ring 26 which encircles the nut 24 and is rigidly secured thereon as by a clamping bolt shown in section at 27. The clutch control lever may be manipulated to rotate the nut 24 at its threaded connection with the annulus and thus to advance or retract the nut with relation to the clutch plates 20 and 21. The nut carries a thrust bearing or clutch throwout bearing 28 which bears against a clutch pressure plate 29 having a portion (not shown) in engagement with the clutch disks 20 and 21 in a conventional manner.

Through the mechanism thus far described, swinging of the clutch control lever 25 to the right as viewed in Fig. 2 causes the plates 20 and 21 to be pressed together and therefore imparts a drive to the brake drum 11 causing it to rotate in a clockwise direction. The control lever 25 is normally biased toward the left by a spring 25a. The clutch control lever 25 may be actuated by a remotely positioned lever of any suitable type to which it is connected as by linkage, a portion of which is illustrated at 30.

As shown in Fig. 2, a rigid housing 31 encircles the brake drum and brake band 10 which surrounds it, and the band 10 is illustrated as having the conventional lining 32 secured to it for frictional contact with the outer surface of the drum 11. One end of the brake band is secured to the housing 31 by a pair of links 33 and 34 pivotally connected to each other by a pin 35. The link 33 is connected to a bracket 36 on one end of the brake band by a pivot pin 37 and the link 34 is connected to a bracket 38 on the housing 31 as by a pin 39.

The opposite end of the brake band is resiliently connected with the housing 31 by means of a spring 40 anchored to the housing by a connection (not shown) and engaging the end of a bell-crank lever 41. This lever is pivoted at 42 to a bracket 43 rigidly secured to the housing 31 and carries a perforated pin 44 receiving a link 45 pivoted as at 46 to a bracket 47 on the brake band. The effective length of the pin 45 is adjustable by nuts 48 and 49 which are threaded on it and which are engageable with opposite sides of the perforated pin 44 through which it extends. The tension of the spring 40 is therefore transmitted to the end of the brake band 10 in a manner to tighten the band around the drum 11. This tension is not sufficient to prevent rotation of the drum in a clockwise direction which results from engagement of the clutch, however, when the clutch is released, if the drum tends to rotate in the opposite direction or counter-clockwise as viewed in Fig. 2, as might be caused by tension on a cable with which the drum is associated, the action of the spring 40 is supplemented by the movement of the drum and the brake band is tightened or snubbed into close contact with the brake drum to prevent rotation thereof.

It is desirable that the tension of the spring 40 be not too great to permit its being readily overcome for the purpose of permitting the drum to rotate counter-clockwise as may be required for spooling out or paying off a cable which is controlled by this mechanism. The present invention, therefore, provides means to supplement the action of the relatively weak spring 40 in tightening the brake band when the drum rotates in a counter-clockwise direction. To this end the jointed linkage which is provided by the links 33 and 34 connected by the pin 35 is normally held in a cocked or angular position by engagement between the pin 35 and the brake band. The links 33 and 34 are of double or bifurcated construction as shown in Fig. 3 and an anti-friction roller 50 is carried by the pin 35 for engagement with a wear plate 51 which, as shown in Fig. 2, is disposed on the bracket 47 which is secured to the end of the brake band.

In operation tendency of the drum 11 to rotate in a counter-clockwise direction tightens the band about the drum. This tightening also tends to move the entire brake band in a counter-clockwise direction and applies a tension to the linkage 33 and 34 tending to straighten it from its cocked position or to bring the pin 35 and roller 50 downwardly where the pressure against the wear plate 51 will supplement the action of the spring 40 in tightening the brake band against the drum. Thus, even though the spring 40 is relatively weak, the snubbing action of the brake band which results from counter-clockwise movement of the drum is automatically supplemented by pressure which results from this tightening action. At the same time any movement of the brake band in a counter-clockwise direction tends to elevate the roller 35 through its contact with the plate 51 and this causes an increase in the angularity of the linkage 33—34 to tighten the entire brake band about the drum.

The clutch control lever 25 is shown in Fig. 2 in its clutch disengaging position and is shown as carrying a roller 53 which engages an inclined edge 54 of the lever 41. When the clutch control lever 25 is swung to the right to effect engagement of the clutch, the roller 53 is moved to an ineffective position. If the clutch control lever 25 is moved to the left beyond the clutch release position shown, the roller 53 will by engagement with the edge 54, raise the lever 41 in opposition to the tension of the spring 40. By raising of the lever 41, tension on the brake band is relaxed through connection of the lever therewith by the link 45 and the brake drum is free to rotate in a counter-clockwise direction for the purpose of spooling out cable which the brake drum controls. A notch 55 formed in the lever 41 adjacent the end of the inclined edge 54 is provided to receive the roller 53 and latch the parts in the release position. This permits a continued paying out of the cable and is useful for the purpose of removing the cable from the drum entirely as may be desirable for the purpose of replacement or repair.

With the construction described, a simple single control mechanism such as a hand actuated lever connected with the cable control lever 25 as through the linkage 30 is operable by movement in one direction to engage the clutch and effect rotation of a cable drum for taking in the cable. Operation of the same lever in the opposite direction disengages the clutch, permits application of the brake with automatically applied supplemental pressure, and further operation in the same direction releases the brake to permit spooling out of the cable and if desired will latch the brake in its released position.

I claim:

1. In combination with a brake drum and a band encircling the drum, an anchor for one end of the band including an articulated linkage, an anchor for the opposite end of the band including resilient means tending to tighten the band but permitting limited movement of the entire band relative to the drum and means on the band engageable with said articulated linkage to bias said linkage and tighten said band upon tendency of the band to move in one direction.

2. In combination with a brake drum, a brake band encircling the drum, an anchor for one end of the band comprising a pair of links pivotally connected and normally assuming a cocked position, a resilient anchor for the opposite end of the band tending to tighten the band upon rotation of the drum in one direction, and said links overlying a part of the band to impart a radial inward pressure to said part of the band when the tendency of the band to rotate with the drum tends to straighten the links.

3. In combination with a brake drum, a brake band encircling the drum, an anchor for one end of the band comprising a pair of links pivotally connected and normally assuming a cocked position, a resilient anchor for the opposite end of the band tending to tighten the band upon rotation of the drum in one direction, and said links overlying the band adjacent its resiliently anchored end whereby upon tendency of the band to rotate with the drum the band will tend to straighten the links from their cocked position to exert a radial inward pressure on the band.

JOHN W. BRIDWELL.

REFERENCES CITED

The following references are of record in the file of this patent:

UNITED STATES PATENTS

| Number | Name | Date |
|---|---|---|
| 1,875,046 | Le Tourneau | Aug. 30, 1932 |
| 1,912,645 | Le Tourneau | June 6, 1933 |
| 1,976,406 | McGiffert et al. | Oct. 9, 1934 |
| 2,175,381 | Dow | Oct. 10, 1939 |
| 2,492,816 | Rosman | Dec. 27, 1949 |